US012625153B2

(12) United States Patent
Kaneko et al.

(10) Patent No.: US 12,625,153 B2
(45) Date of Patent: May 12, 2026

(54) CONVEYANCE DEVICE

(71) Applicant: Hitachi High-Tech Corporation, Tokyo (JP)

(72) Inventors: Satoru Kaneko, Tokyo (JP); Takahiro Suzuki, Tokyo (JP); Yasuaki Aoyama, Tokyo (JP); Ryosuke Hoshi, Tokyo (JP); Shinji Azuma, Tokyo (JP); Takeshi Tamakoshi, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 195 days.

(21) Appl. No.: 18/704,389

(22) PCT Filed: Sep. 13, 2022

(86) PCT No.: PCT/JP2022/034137
§ 371 (c)(1),
(2) Date: Apr. 24, 2024

(87) PCT Pub. No.: WO2023/084901
PCT Pub. Date: May 19, 2023

(65) Prior Publication Data
US 2024/0420877 A1       Dec. 19, 2024

(30) Foreign Application Priority Data

Nov. 9, 2021       (JP) ................................. 2021-182737

(51) Int. Cl.
*G01N 35/04*          (2006.01)
*H02P 6/16*           (2016.01)
(52) U.S. Cl.
CPC ............... *G01N 35/04* (2013.01); *H02P 6/16* (2013.01); *G01N 2035/0477* (2013.01); *G01N 2035/0491* (2013.01); *G01N 2035/0493* (2013.01)

(58) Field of Classification Search
CPC ........... G01N 35/04; G01N 2035/0477; G01N 2035/0491; G01N 2035/0493; H02P 6/16; H02P 25/064
See application file for complete search history.

(56) References Cited

U.S. PATENT DOCUMENTS

2014/0234065 A1     8/2014   Heise et al.
2016/0268883 A1     9/2016   Kakihara et al.
(Continued)

FOREIGN PATENT DOCUMENTS

JP          62-135297 A        6/1987
JP          H10206104 A    *   8/1998
(Continued)

OTHER PUBLICATIONS

International Search Report issued in PCT Application No. PCT/JP2022/034137 dated Nov. 22, 2022, with English Translation.

*Primary Examiner* — Daniel Cavallari
(74) *Attorney, Agent, or Firm* — Foley & Lardner LLP

(57) ABSTRACT

Provided is a conveyance device that conveys a conveyance object having a magnetic body, the conveyance device including: a plurality of coils configured to generate magnetic flux acting on the magnetic body; a coil driving unit configured to apply a voltage to each of the plurality of coils; and a calculation control unit including a current control unit and a position estimation unit. The current control unit determines the voltage. The position estimation unit estimates a position of the conveyance object based on a change in a current generated by applying a voltage pulse to the coils and switches, according to a position estimation value that indicates the position of the conveyance object estimated by the position estimation unit, between a speed control mode in which a speed of the conveyance object is controlled and a current control mode in which a current through the coils is controlled. Accordingly, in the convey- (Continued)

ance device that has a function of estimating the position of the conveyance object based on information on the current flowing through winding wires of the coils, it is possible to implement stable conveyance speed control even in a section in which accuracy for estimating the position or speed of the conveyance object is low.

4 Claims, 6 Drawing Sheets

(56)                    References Cited

U.S. PATENT DOCUMENTS

| | | |
|---|---|---|
| 2017/0101277 A1 | 4/2017 | Malinowski |
| 2018/0079605 A1* | 3/2018 | Koga ..................... B65G 35/06 |
| 2022/0144556 A1 | 5/2022 | Aoyama et al. |
| 2022/0252628 A1 | 8/2022 | Tamakoshi et al. |

FOREIGN PATENT DOCUMENTS

| | | |
|---|---|---|
| JP | 2016-171669 A | 9/2016 |
| JP | 2017-077971 A | 4/2017 |
| JP | 2017-102103 A | 6/2017 |
| JP | 2020-125930 A | 8/2020 |
| JP | 2020-142913 A | 9/2020 |
| WO | WO-2021/002080 A1 | 1/2021 |

* cited by examiner

CONVEYANCE DEVICE

TECHNICAL FIELD

The present disclosure relates to a conveyance device.

BACKGROUND ART

With the advancement of medical care and aging of society, the importance of specimen processing in a clinical test is increasing.

A specimen processing device used in a clinical test tests a predetermined analysis item on a biological sample (a specimen) of a body fluid or the like such as blood, plasma, serum, and urine. The specimen processing device can connect devices having a plurality of functions and automatically process each step. In other words, in order to rationalize work in an inspection room, analysis units in a plurality of analysis fields such as biochemistry and immunity are connected by a conveyance line and are operated as one device.

A conveyance line in the related art is mainly of a belt drive type. Therefore, when conveyance is stopped due to an abnormality occurring in the middle of the conveyance, a specimen cannot be supplied to a downstream device.

In order to improve a processing capacity of a specimen processing device, it is desired to convey specimens at high speed, convey a large number of specimens at the same time, and convey specimens in a plurality of directions.

PTL 1 discloses an electromagnetic actuator that is a container carrier including a magnetic active device such as a permanent magnet, that is disposed to be stationary below a conveyance plane adapted to carry a container adapted to carry a sample container, and that is adapted to move the container carrier on the conveyance plane by applying a magnetic force to the container carrier. Further, PTL 1 discloses that a speed of the container carrier that is moved on the conveyance plane is set by setting a time between contiguous activation of adjacent electromagnetic actuators. Further, PTL 1 discloses that a container carrier detection device embodied based on a reflected light barrier mainly including an infrared ray (IR) is provided in order to detect a presence and position of the container carrier positioned on the conveyance plane.

PTL 2 discloses a configuration in which each of a plurality of electromagnetic actuators used in a laboratory sample distribution system includes a ferromagnetic core and an excitation winding wire, and the excitation winding wire exceeds the assigned ferromagnetic core in a vertical direction. In addition, PTL 2 discloses that the plurality of electromagnetic actuators are disposed below a transfer surface of the laboratory sample distribution system, and a plurality of position sensors embodied as Hall sensors are distributed on the transfer surface.

Further, PTL 3 discloses a conveyance device including a first magnetic body provided on a conveyance body side, a magnetic circuit including a core made of a second magnetic body and a winding wire wound around an outer peripheral side of the core, a driving circuit for supplying a current to the winding wire of the magnetic circuit, and a conveyance body detection unit for detecting a position or a speed of the magnetic body. The current supplied to the winding wire is changed based on the position or the speed information of the magnetic body detected by the conveyance body detection unit.

PTL 4 discloses a conveyance device in which a coil driving unit that applies a voltage to each of a plurality of coils applies a driving current to a predetermined coil based on a position of a conveyance object estimated by a position estimation unit and path information stored in a path information storage unit, and applies a current for position detection to a closest coil estimated to be closest to the conveyance object and coils around the closest coil. Further, PTL 4 discloses that a current change amount for each position is calculated based on an inductance characteristic, a position of a permanent magnet is estimated at any time by sequentially calculating the current change amount, it is determined whether a conveyance object deviates from a predetermined path, and a pulse voltage is output to the predetermined coil so as to return to the predetermined path.

CITATION LIST

Patent Literature

PTL 1: JP2017-77971A
PTL 2: JP2017-102103A
PTL 3: JP2020-142913A
PTL 4: JP2020-125930A

SUMMARY OF INVENTION

Technical Problem

A large number of sensors (position sensors) for detecting the positions of the container carrier detection device in PTL 1 and the Hall sensors in PTL 2 are required, and there is a concern that a cost is increased and reliability is lowered due to a failure of the position sensor. Further, in PTLS 1 and 2, since the presence or absence of the conveyance object cannot be detected unless the conveyance object approaches the position sensor to some extent, it is considered that it is difficult to detect the conveyance object in all regions on the conveyance surface.

In PTL 3, the current flowing through the winding wire is changed according to the position, weight, and the like of the conveyance object, but a method of determining a value of a current in a section in which the detection of the position and the like is difficult is unknown. Therefore, it is conceivable that variations in speed occur among the conveyance objects.

In PTL 4, although the deviation of the conveyance object is corrected, adjustment of the speed of the conveyance object is unclear.

An object of the present disclosure is to implement, in a conveyance device that has a function of estimating a position of a conveyance object based on information on a current flowing through winding wires of coils, stable conveyance speed control even in a section in which accuracy for estimating a position or speed of the conveyance object is low.

Solution to Problem

A conveyance device according to the present disclosure conveys a conveyance object having a magnetic body, the conveyance device including: a plurality of coils configured to generate magnetic flux acting on the magnetic body; a coil driving unit configured to apply a voltage to each of the plurality of coils; and a calculation control unit including a current control unit and a position estimation unit. The current control unit determines the voltage. The position estimation unit estimates a position of the conveyance object based on a change in a current generated by applying a voltage pulse to the coils and switches, according to a position estimation value that indicates the position of the conveyance object estimated by the position estimation unit, between a speed control mode in which a speed of the conveyance object is controlled and a current control mode in which a current through the coils is controlled.

Advantageous Effects of Invention

According to the present disclosure, in the conveyance device that has a function of estimating the position of the conveyance object based on information on the current flowing through winding wires of the coils, it is possible to implement stable conveyance speed control even in a section in which accuracy for estimating the position or speed of the conveyance object is low.

DESCRIPTION OF EMBODIMENTS

The present disclosure relates to a specimen analysis system that analyzes a biological sample (hereinafter, referred to as a "specimen") such as blood and urine, and a conveyance device suitable for a specimen preprocessing device that performs preprocessing necessary for an analysis.

Hereinafter, an embodiment of the present disclosure will be described with reference to the drawings.

Embodiment

Figure 1:
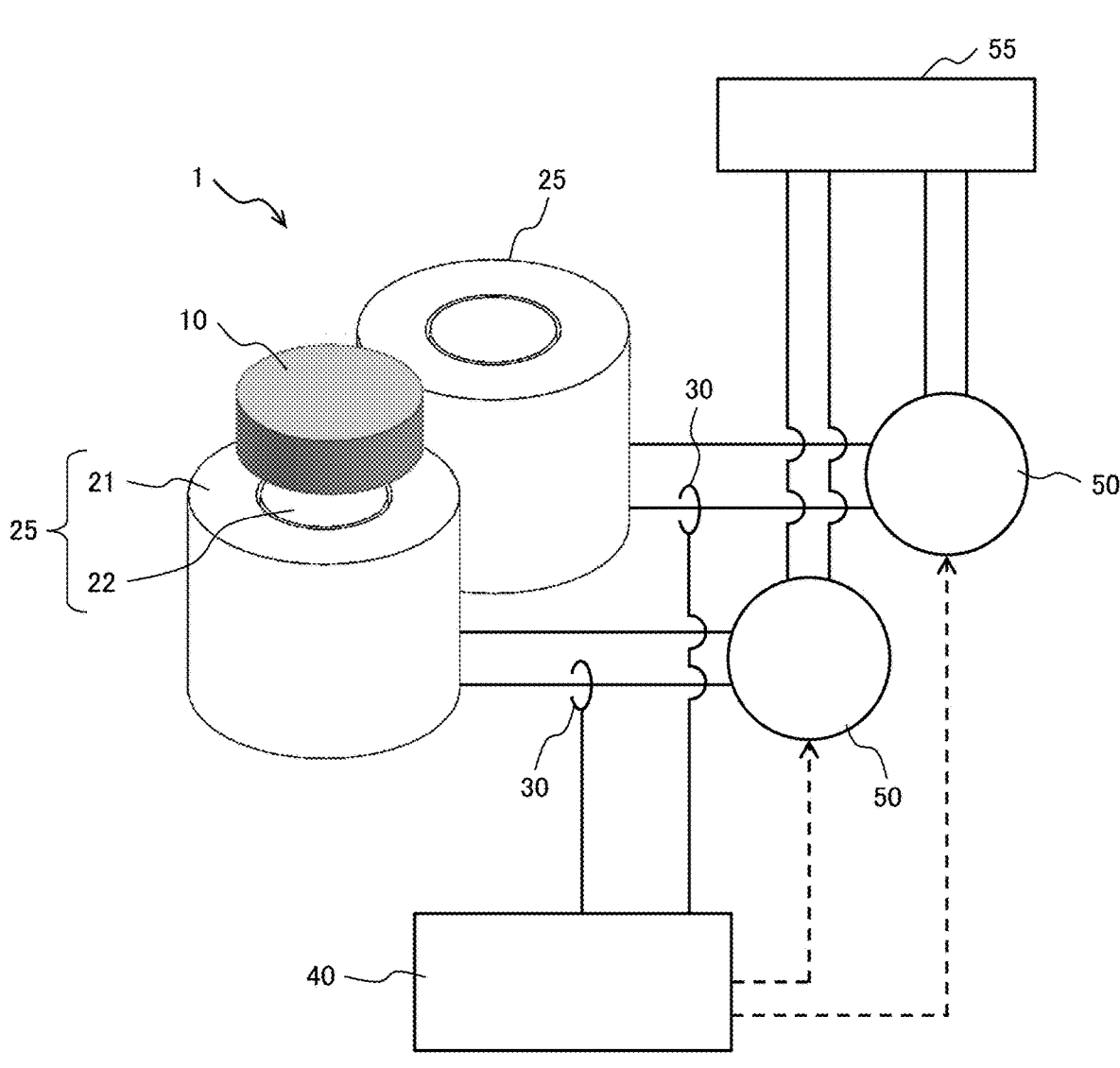
FIG. 1 is a schematic configuration diagram showing a conveyance device according to an embodiment.

FIG. 1 is a schematic configuration diagram showing a conveyance device according to an embodiment.

In the drawing, a conveyance device 100 includes a permanent magnet 10, two coils 25, coil driving units 50 (driving circuits), a power supply 55, a current detector 30, and a calculation unit 40 (calculation control unit). The permanent magnet 10 is provided in a specimen folder or the like which is a conveyance object. The coil 25 includes a cylindrical core 22 and a winding wire 21 provided on an outer peripheral side of the core 22. Although two coils 25 are shown in the drawing, two or more coils 25 are usually provided.

The coil driving units 50 are connected to the coils 25, respectively. The current detector 30 detects a current flowing from each coil driving unit 50 to the winding wire 21 of each coil 25.

A propulsive force is generated in the permanent magnet 10 by an interaction with the coil 25. A conveyance object such as the specimen folder provided with the permanent magnet 10 is moved when the conveyance object receives the propulsive force. Accordingly, a specimen container or the like (not shown) provided in the specimen folder is conveyed. A speed, a movement direction, a destination, and the like of the conveyance object are adjusted by controlling a current flowing through the coil 25.

In general, a conveyance surface (not shown) for supporting the permanent magnet 10 is provided between the coil 25 and the permanent magnet 10. A plurality of coils 25 may be provided in a row below the conveyance surface. In this case, the conveyance surface may be a surface on which the conveyance object is moved along a linear or curved path. When the conveyance surface is an xy plane, a plurality of coils 25 may be provided below the xy plane in rows in each of an x axis direction and a y axis direction. The permanent magnet 10 is moved in a manner of sliding on the conveyance surface. A container to be conveyed is not limited to the specimen container, and may be a reagent container or the like. Therefore, the container to be conveyed may be referred to as a "conveyance container". In addition, the conveyance object includes a small conveyable device.

The conveyance device 100 moves the conveyance object between the coils 25 by applying a current to the winding wire 21 and applying an electromagnetic force to the permanent magnet 10. In order to efficiently apply the electromagnetic force and move the conveyance object in a desired direction, relative position information between the permanent magnet 10 and the coil 25 is required.

For example, when the permanent magnet 10 is located directly above one of the two coils 25, no force in a conveyance direction is generated even when a current flows through the coil 25 directly below the permanent magnet 10. On the other hand, when a current flows through the coil 25 adjacent to the coil 25 directly below the permanent magnet 10, a force for attracting the permanent magnet 10 to the adjacent coil 25 can be generated. That is, a force can be efficiently generated and a direction of the force can be controlled.

By adopting a configuration in which three or more coils 25 are disposed side by side and sequentially switching the coils 25 to be energized (energized coils), it is possible to freely move the conveyance object provided with the permanent magnet 10.

In the present embodiment, a method based on inductance characteristics of the coil 25 is used to detect a position of the permanent magnet 10 on the conveyance surface. This point is different from a method of detecting a position of the conveyance object by arranging a large number of position sensors on the conveyance surface as in the technique of the related art.

When a large number of position sensors are used as in the related art, position information can be obtained, but a substrate or the like on which a position sensor is newly mounted is required, which causes a problem of an increase in cost and an increase in size of the device.

Hereinafter, a position detection method according to the embodiment will be described.

When the permanent magnet 10 is located above the front-side coil 25 shown in FIG. 1, magnetic flux generated by the permanent magnet 10 acts on the coil 25. A magnitude of the acting magnetic flux is different between the front-side coil 25 and a back-side coil 25. In other words, the magnitude of the magnetic flux acting on the coil 25 changes depending on a relative position relationship between the permanent magnet 10 and the coil 25.

When a voltage is applied to the winding wire 21 by the coil driving unit 50 to cause a current to flow through the winding wire 21, magnetic flux generated by the current is generated in the core 22. Therefore, in the core 22, the magnetic flux generated by the permanent magnet 10 and the magnetic flux generated by the current flowing through the winding wire 21 overlap each other.

In general, when a current flows through the winding wire 21, a magnetic field is generated around the winding wire 21. At this time, the generated magnetic flux is proportional to a value of the flowing current. This proportional constant is called an inductance.

However, in a circuit including a magnetic body such as the core 22, the inductance changes due to magnetic saturation characteristics of the core 22. That is, the inductance of the winding wire 21 changes depending on the magnitude of the magnetic flux of the permanent magnet 10. This refers to that the inductance of the winding wire 21 changes depending on the position of the permanent magnet 10 (that is, conveyance object).

Therefore, if the inductance of the winding wire 21 can be measured, the position of the permanent magnet 10 on the conveyance surface can be detected.

The above is a principle of the position detection method based on the inductance characteristics of the coil 25.

Next, the more specific principle of the position detection method will be described.

A voltage V generated in the winding wire 21 is expressed by the following Formula (1). That is, the voltage V is a change amount of the magnetic flux per unit time.

$$V = -d\varphi / dt \qquad (1)$$

In this Formula, $\varphi$ is the magnetic flux, and t is a time.

When a current is I and the inductance is L, the following relational Formula (2) is established.

$$dI / dt = (1 / L) \times (d\varphi / dt) \qquad (2)$$

The following relational Formula (3) is obtained from the above Formulas (1) and (2).

$$dI / dt = -V / L \qquad (3)$$

That is, when a constant voltage is applied to the winding wire 21, a time derivative of the supplied current I changes depending on a magnitude of the inductance L as shown in the above Formula (3). This refers to that when a voltage is applied, a manner of rising the supplied current is different.

Accordingly, the inductance L can be calculated and obtained by detecting a change amount (dI/dt) in the current generated in the winding wire 21 when a voltage is applied to the winding wire 21. That is, if characteristics of the inductance L of the winding wire 21 that change depending on the position of the permanent magnet 10 can be grasped in advance, the position of the permanent magnet 10, that is, the conveyance object is obtained by applying a voltage signal for position detection and detecting the change amount (dI/dt) in the current generated by applying the voltage signal.

Next, a position detection method without the position sensor according to the embodiment will be further described.

As shown in FIG. 1, a voltage is applied to the winding wire 21 by the coil driving unit 50, and a coil current flowing by the voltage is detected by the current detector 30. Here, the coil driving unit 50 corresponds to, for example, a bidirectional chopper driven by a pulse width modulation (PWM) signal. The current detector 30 for detecting a current may be a current detector using a shunt resistor or a current transformer, or a current detector using a Hall current sensor, and the present embodiment is not particularly limited thereto.

The coil driving unit 50 is connected to the power supply 55, and a predetermined current flows through the winding wire 21 of the coil 25 by performing duty control on a power supply voltage.

Further, the calculation unit 40 calculates a voltage command value to be applied to the coil driving unit 50 in order to obtain a propulsive force necessary for conveying the conveyance object, measures a current change rate dI/dt generated in the coil 25 based on a current value detected by the current detector 30, calculates the relative positional relationship between the coil 25 and the permanent magnet 10, and estimates the position of the permanent magnet 10 in the conveyance device 1. The calculation unit 40 uses the estimated position information of the permanent magnet 10 to determine a timing at which a current necessary for conveying the permanent magnet 10 (conveyance object) is supplied from the coil driving unit 50, and causes the current to flow through the actually appropriate coil 25.

Figure 2:
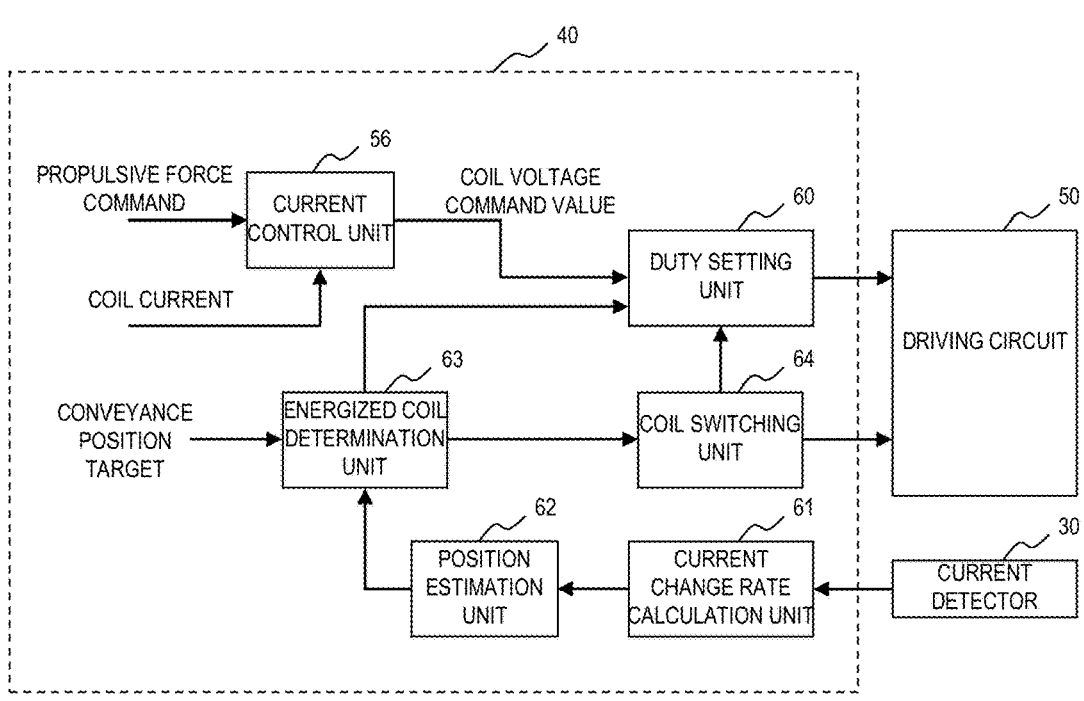
FIG. 2 is a block diagram showing a configuration of a calculation unit shown in FIG. 1.

FIG. 2 is a block diagram showing a configuration of the calculation unit shown in FIG. 1.

In FIG. 2, the calculation unit 40 of the conveyance device includes a current control unit 56, a duty setting unit 60, a current change rate calculation unit 61, a position estimation unit 62, an energized coil determination unit 63, and a coil switching unit 64.

A propulsive force command (command of causing a current to flow through the coil) and an actual coil current are input to the current control unit 56. The current control unit 56 calculates a coil voltage command value and outputs the coil voltage command value to the duty setting unit 60. In this case, the coil voltage command value to be applied to the coil is calculated, so that a value of the actual coil current matches a value of the command of causing a current to flow through the coil. In other words, the current control unit 56 determines the voltage applied by the coil driving unit 50.

The duty setting unit 60 determines a voltage pulse signal such as the PWM and outputs the voltage pulse signal to the coil driving unit 50.

On the other hand, in order to determine which coil of the plurality of coils 25 is energized, the current value from the current detector 30 is input, the current change rate (dI/dt) of the coil is calculated by the current change rate calculation unit 61, and the position of the conveyance object is estimated in the position estimation unit 62 according to the value of the current change rate (dI/dt).

Further, the energized coil determination unit 63 determines the coil to be actually energized based on a conveyance position target of the specimen and the position of the conveyance object. In accordance with this determination, the coil switching unit 64 switches the circuit, so that the desired coil 25 can be energized. A control block described here can be implemented by a calculation device such as a microcomputer.

The position estimation unit 62 receives, as described above, the current change rate (dI/dt), which is a value inversely proportional to the inductance L of the coil 25, and calculates and outputs a position estimation value of the conveyance object. The position estimation value is a value indicating the position of the conveyance object. In summary, the position estimation value is calculated based on the current change rate of the predetermined coil among the plurality of coils.

Figure 3:
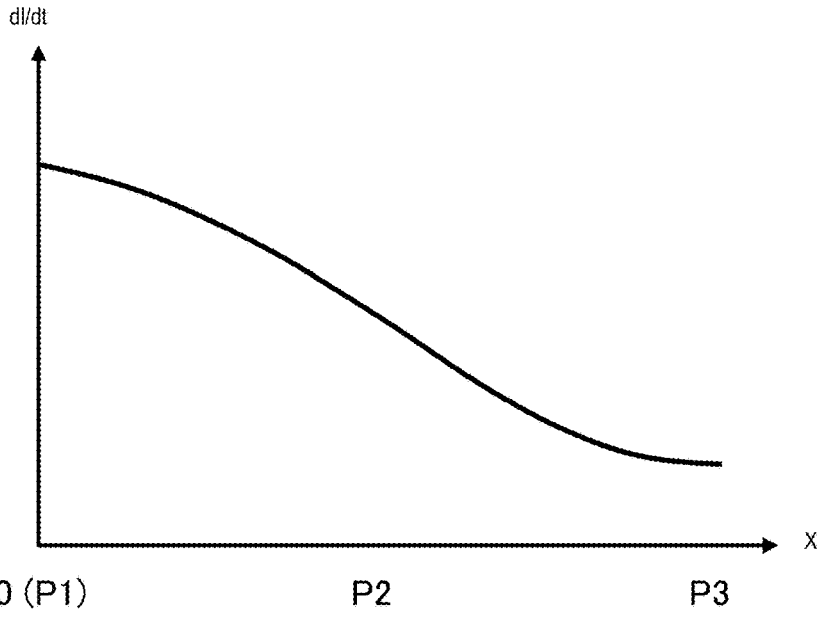
FIG. 3 is a graph showing an example of how a time change rate of a current flowing through a coil 25 in FIG. 1 is affected by a position of a permanent magnet 10.

FIG. 3 is a graph showing an example of how a time change rate of a current flowing through the coil 25 in FIG. 1 is affected by the position of the permanent magnet 10. A horizontal axis represents a position X of the conveyance object including the permanent magnet 10, and a vertical axis represents the current change rate dI/dt (unit: A/s) of the coil 25. X=0 is set with a portion directly above the coil 25 as an origin point. As described above, dI/dt is inversely proportional to the inductance L, and is inversely proportional to L when the coil 25 and the permanent magnet 10 are regarded as being integrated, in other words, in a state in which the permanent magnet 10 affects the coil 25.

As shown in FIG. 3, dI/dt decreases as the permanent magnet 10 moves away from the portion directly above the coil 25. A position P3 is a portion directly above the adjacent coil 25, and a position P2 is a midpoint of a line segment connecting the positions P1 and P3. At P1 and P3, a gradient of dI/dt is small.

In the position estimation unit 62 of FIG. 2, for example, a characteristic table showing a relationship between the position of the conveyance object (permanent magnet 10) and the current change rate as shown in FIG. 3 is recorded.

In the present embodiment, it is a principle to estimate the position of the conveyance object using the above position characteristics of the inductance, but in a control logic to be actually processed, the current change rate of the coil is used as an input. Therefore, a position characteristic data table of the current change rate (dI/dt) as shown in FIG. 3 is set in the position estimation unit 62.

Here, a method of applying a voltage necessary for detecting the position of the conveyance object will be described.

Figure 4:
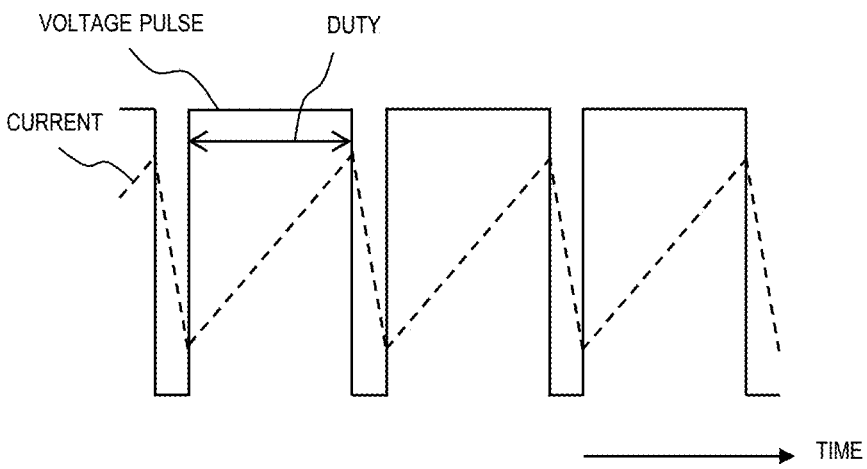
FIG. 4 is a graph showing an example of a waveform of a voltage pulse to a coil to be applied.

FIG. 4 is a graph showing an example of a waveform of a voltage pulse to a coil to be applied.

The voltage pulse shown in FIG. 4 is a voltage signal generated by a PWM conversion method, and is a conversion method of increasing or decreasing a pulse width of a voltage according to a magnitude of a voltage to be applied. When this voltage is applied to the coil 25, a current is generated in which a current pulsation (current change as indicated by a broken line in the drawing) generated by the pulse is superimposed on an average current necessary for generating a propulsive force.

By generating such a current, the conveyance object can be conveyed, and the current change rate at that time is measured simultaneously, so that the position of the conveyance object can be estimated.

Figure 5:
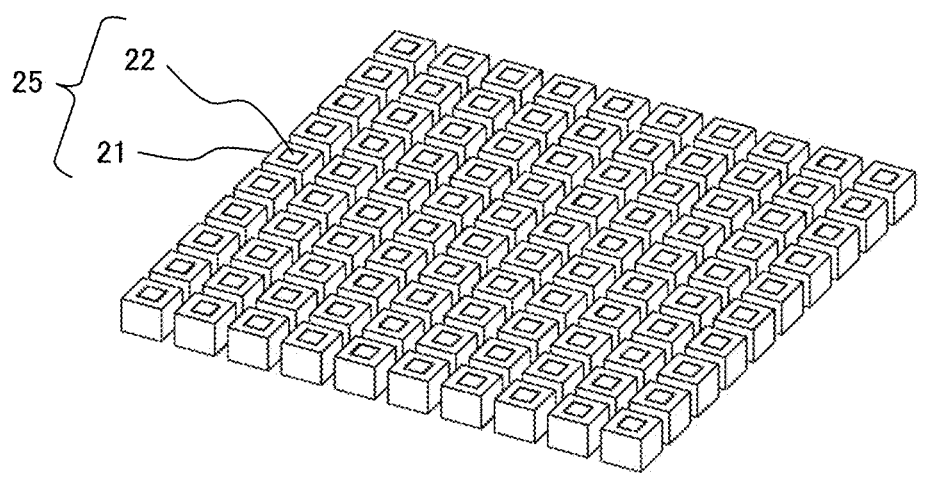
FIG. 5 is a perspective view showing an arrangement of coils of the conveyance device.

FIG. 5 is a perspective view showing an arrangement of the coils of the conveyance device.

As shown in FIG. 5, the conveyance device includes a plurality of coils 25. Each coil 25 includes the winding wire 21 and the core 22. An appropriate voltage pulse is applied to the coil 25 in a vicinity of the conveyance object according to a conveyance path of the conveyance object among the coils 25 to detect the position of the conveyance object, and the conveyance object is conveyed.

From the viewpoint of improvement of a conveyance capability of the conveyance device and subsequent mass conveyance of the specimens, it is necessary to control the speed of each conveyance object with high accuracy, so that the speed of each conveyance object becomes the same and constant, and the adjacent conveyance objects do not come into contact with each other even when a distance between the conveyance objects becomes short.

In order to implement such speed control, it is desirable to perform feedback control of the speed of the conveyance object.

Figure 6:
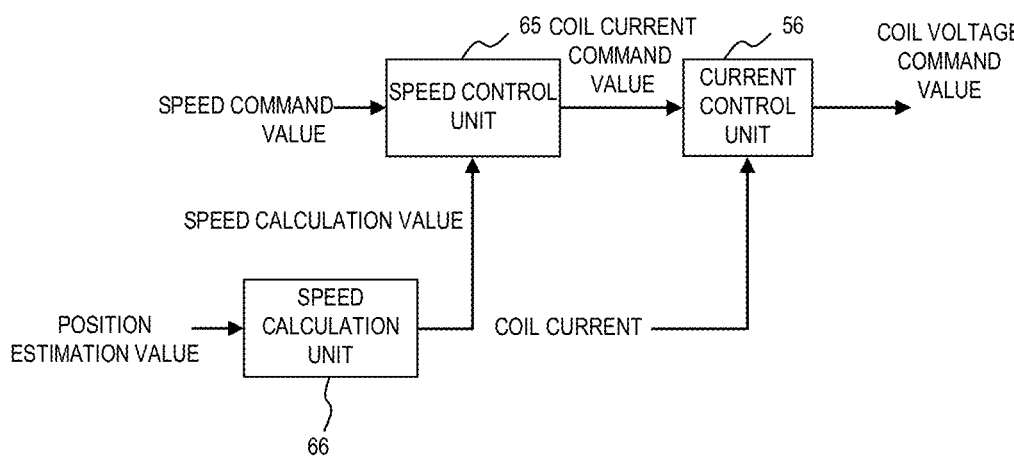
FIG. 6 is a block diagram showing an example of a configuration for implementing feedback control of a speed of a conveyance object.

FIG. 6 is a block diagram showing an example of a configuration for implementing the feedback control of the speed of the conveyance object.

A speed command value of the conveyance object determined according to a current specimen conveyance amount is input to the speed control unit 65. The above position estimation value of the conveyance object is input to the speed calculation unit 66, and a speed calculation value of the conveyance object is calculated. The speed calculation value is input to the speed control unit 65 as a feedback value. The speed control unit 65 calculates a coil current command value.

The coil current command value is input to the current control unit 56. A coil current is also input to the current control unit 56. The current control unit 56 calculates and outputs the coil voltage command value using the coil current as the input.

Here, the speed control unit 65 and the current control unit 56 can implement functions thereof by implementing proportional integral calculation. Further, the speed calculation unit 66 can obtain the speed calculation value of the conveyance object by calculating a position change amount (dx/dt) for each predetermined time interval using the input position estimation value of the conveyance object.

As described above, by forming a speed control system shown in FIG. 6, it is possible to control the conveyance speed of the conveyance object.

However, in the present embodiment, a method of estimating the position of the conveyance object according to the change amount of the coil current, that is, a method with less position sensor is used without providing the position sensors for measuring the position of the conveyance object. Accordingly, characteristics of the speed calculation value of the conveyance object obtained by the speed calculation unit 66 is affected by the accuracy of the position estimation with less position sensor.

The accuracy of the position estimation can be determined based on, for example, characteristics of the current change rate of the coil with respect to the position of the conveyance object shown in FIG. 3. As shown in FIG. 3, in particular, the value of the current change rate decreases as the conveyance object moves away from the energized coil, in other words, approaches the position P3. That is, the inductance increases.

Therefore, in a section in a vicinity of the position P3, the accuracy of the position estimation decreases due to accuracy of the current detection being affected. A calculation value (specimen conveyance speed calculation value) of the conveyance speed of the conveyance object obtained from a temporal change of the position estimation value of which the accuracy is reduced as described above is also a value including an error. When the speed calculation value including such an error is input to the speed control unit 65, accuracy of the speed control also decreases. As a result, it may be difficult to convey a large amount of specimens.

In order to solve the above problem and control the conveyance speed of the specimen with high accuracy, it is effective to stop the speed feedback control and directly input the coil current command to implement the current control in a position section where the estimation accuracy is low.

Figure 7:
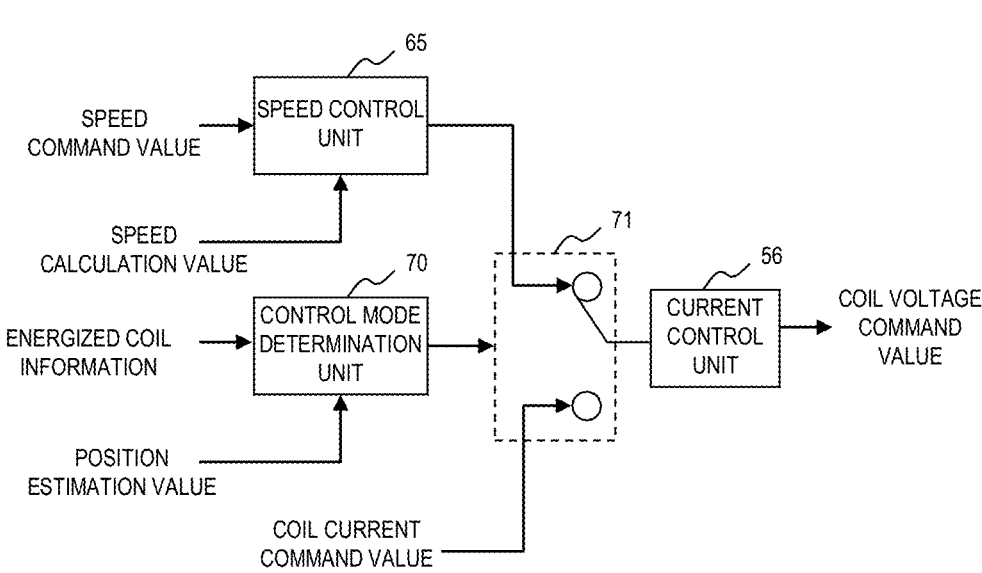
FIG. 7 is a block diagram showing a configuration of control for switching a control mode based on a position estimation value of the conveyance object.

FIG. 7 is a block diagram showing a configuration of control for switching a control mode based on the position estimation value of the conveyance object.

In FIG. 7, a control mode determination unit 70 and a control mode switching unit 71 are added to the speed control unit 65 and the current control unit 56 shown in FIG. 6. All of these components are included in the calculation unit 40. The control mode switching unit 71 is provided between the speed control unit 65 and the current control unit 56. The control mode determination unit 70 is connected to the control mode switching unit 71.

The control mode determination unit 70 has a preset threshold value of the position estimation value.

The control mode determination unit 70 receives energized coil information and the position estimation value, determines that accuracy of the speed calculation is low when the position estimation value is equal to or less than the threshold value (when away from the energized coil), and sets a current control mode. In this case, a connection state is switched from a connection state shown in FIG. 7. Here, the current control mode refers to a control mode for controlling the current of the coil (coil current).

On the other hand, when the control mode determination unit 70 determines that the position estimation value is larger than the threshold value (when close to the energized coil), the accuracy of the speed calculation is determined to be high, and a speed control mode is set as the connection state shown in FIG. 7. Here, the speed control mode refers to a control mode for controlling the speed of the conveyance object.

Specifically, in the speed control mode, the coil current command value output from the speed control unit 65 is input. In addition, in the current control mode, the coil current is freely determined and directly input to the current control unit 56. As described above, it is possible to maintain stable conveyance speed control performance even when the accuracy of the speed calculation value is low. The method of determining the coil current command value in the above current control mode can be freely set as long as the performance of the specimen conveyance is not impaired. For example, if the current command is equivalent to a value of the current flowing through the energized coil in a last time, the conveyance speed control with small speed fluctuation can be continued. In summary, in the current control mode, a current command is generated based on a magnitude of a current flowing through an energized coil at a last time.

To summarize the above switching, the control mode determination unit 70 receives information on a coil being energized among the plurality of coils and the position estimation value, determines the switching based on accuracy of a calculation value of the speed of the conveyance object, and transmits a result of the determination to the control mode switching unit 71.

Next, an example of the operation according to the control of switching between the speed control mode and the current control mode will be described.

Figure 8A:
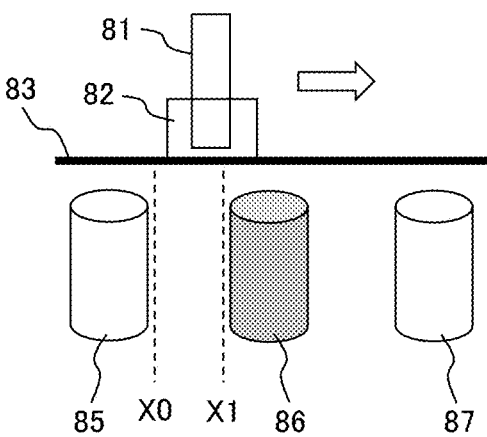
FIG. 8A is a schematic diagram showing a speed control mode.

FIG. 8A is a schematic diagram showing the speed control mode.

As shown in FIG. 8A, coils 85, 86, and 87 are disposed below a conveyance surface 83 from left to right in FIG. 8A. A conveyance container 82 on which a specimen 81 is placed is movably disposed on an upper surface of the conveyance surface 83.

In the drawing, the coil 86 is in a state of being energized and excited. The conveyance container 82 moves in a section from X0 to X1 positioned between the two coils 85 and 86. This section is a section where position sensitivity of the current change rate shown in FIG. 3 is high, that is, a section where the conveyance speed can be calculated with high accuracy, and the speed control mode is preferable.

Figure 8B:
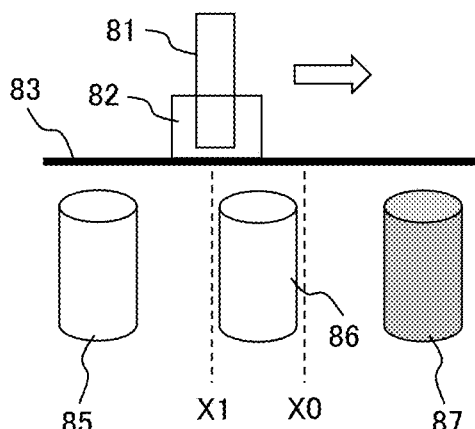
FIG. 8B is a schematic diagram showing a current control mode.

FIG. 8B is a schematic diagram showing the current control mode.

In the drawing, the coil 87 is in a state of being energized and excited. The conveyance container 82 moves in a section from the position section X1 to X0 positioned at a portion directly above the coil 86. This section is a section where position sensitivity of the current change rate shown in FIG. 3 is low, that is, a section where the conveyance speed cannot be calculated with high accuracy, and the current control mode is preferable.

As described above, the energized coil is switched from the coil 86 to the coil 87 when the conveyance container 82 moves and passes through the position X1.

Here, a description will be given of how the conveyance speed differs between a case where the control mode is switched, that is, the speed control mode and the current control mode are switched and a case where the speed control mode and the current control mode are not switched.

Figure 9A:
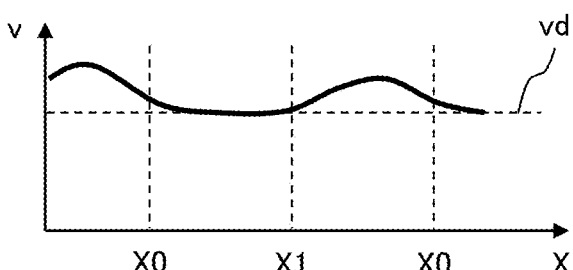
FIG. 9A is a graph showing a conveyance speed according to a comparative example.

FIG. 9A is a graph showing a conveyance speed according to a comparative example. A horizontal axis represents the position X, and a vertical axis represents a conveyance speed v.

In FIG. 9A, since the control mode is not switched, the accuracy of the conveyance speed is low in the section from X1 to X0 where the position sensitivity of the current change rate is low. Therefore, an actual conveyance speed (indicated by a solid curve) deviates from a speed command value vd (indicated by a broken line). In other words, in the section, a difference between the actual conveyance speed and the speed command value vd becomes large.

Figure 9B:
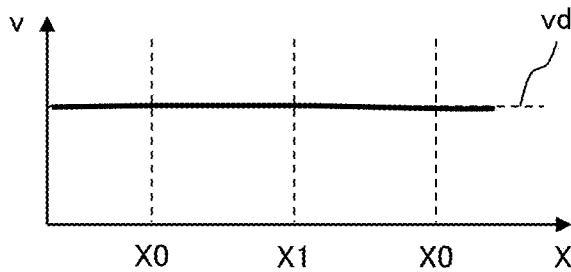
FIG. 9B is a graph showing a conveyance speed according to the embodiment.

On the other hand, FIG. 9B is a graph showing the conveyance speed according to the embodiment. A horizontal axis represents the position X, and a vertical axis represents a conveyance speed v.

In FIG. 9B, the control mode is switched. In this case, in the section from X1 to X0 in which the position sensitivity of the current change rate is low, since the driving is continued using the current command in the preceding section from X0 to X1, the deviation of the actual conveyance speed from the speed command value is prevented.

As described above, in the conveyance device that performs the position estimation with less position sensor using the value of the coil current, the control mode is switched according to the position of the conveyance object during conveyance, so that the conveyance speed control can be performed with high accuracy.

REFERENCE SIGNS LIST

10: permanent magnet
21: winding wire

22: core
25: coil
30: current detector
40: calculation unit
50: coil driving unit
55: power supply
56: current control unit
60: duty setting unit
61: current change rate calculation unit
62: position estimation unit
63: energized coil determination unit
64: coil switching unit
65: speed control unit
66: speed calculation unit
70: control mode determination unit
71: control mode switching unit
81: specimen
82: conveyance container
83: conveyance surface
85, 86, 87: coil
100: conveyance device

The invention claimed is:

1. A conveyance device that conveys a conveyance object including a magnetic body, the conveyance device comprising:

a plurality of coils configured to generate magnetic flux acting on the magnetic body;

a coil driving unit configured to apply a voltage to each of the plurality of coils; and a calculation control unit including a current control unit and a position estimation unit, wherein the current control unit determines the voltage, the position estimation unit estimates a position of the conveyance object based on a change in a current generated by applying a voltage pulse to the coils, and switches, according to a position estimation value that indicates the position of the conveyance object estimated by the position estimation unit, between a speed control mode in which a speed of the conveyance object is controlled and a current control mode in which a current through the coils is controlled.

2. The conveyance device according to claim 1, wherein in the current control mode, a current command is generated based on a magnitude of a current flowing through an energized coil at a last time.

3. The conveyance device according to claim 1, wherein the position estimation value is calculated based on a current change rate of a predetermined coil among the plurality of coils.

4. The conveyance device according to claim 1, wherein the calculation control unit further includes a control mode determination unit and a control mode switching unit, and the control mode determination unit receives information on a coil being energized among the plurality of coils and the position estimation value, determines the switching based on accuracy of a calculation value of the speed of the conveyance object, and transmits a result of the determination to the control mode switching unit.

* * * * *